(12) United States Patent
Huynh-Tran et al.

(10) Patent No.: US 6,780,922 B2
(45) Date of Patent: Aug. 24, 2004

(54) ADHESION PROMOTERS WITH EPOXY-REACTIVE GROUPS

(75) Inventors: Truc-Chi Huynh-Tran, Chesterfield, VA (US); Huy X. Nguyen, Midlothian, VA (US)

(73) Assignee: Honeywell International Inc., Morristown, NJ (US)

( * ) Notice: Subject to any disclaimer, the term of this patent is extended or adjusted under 35 U.S.C. 154(b) by 173 days.

(21) Appl. No.: 10/053,275

(22) Filed: Jan. 17, 2002

(65) Prior Publication Data

US 2003/0152758 A1 Aug. 14, 2003

(51) Int. Cl.$^7$ ............................................. B32B 25/02
(52) U.S. Cl. ..................... 524/501; 428/295.1; 428/375; 428/395; 524/504; 524/515; 524/533; 156/332; 156/338
(58) Field of Search ............................... 156/332, 338; 524/501, 504, 515, 533, 114, 572; 428/295.1, 375, 395

(56) References Cited

U.S. PATENT DOCUMENTS

| | | | |
|---|---|---|---|
| 3,429,354 A | 2/1969 | Brooks | 152/357 |
| 3,644,136 A | 2/1972 | McCullough | 117/47 A |
| 3,902,950 A | 9/1975 | Tung et al. | 156/308 |
| 3,903,332 A | 9/1975 | Kelly et al. | 427/207 |
| 4,467,064 A | 8/1984 | Kudo et al. | 524/114 |
| 4,472,463 A | 9/1984 | Solomon | 427/381 |
| 4,477,497 A | 10/1984 | Kudo et al. | 427/386 |
| 4,794,041 A | 12/1988 | Gillberg-LaForce | 428/394 |
| 6,048,924 A | 4/2000 | Obayashi et al. | 524/501 |
| 6,497,949 B1 * | 12/2002 | Hyde et al. | 428/355 EN |
| 6,521,698 B2 * | 2/2003 | Scholl et al. | 524/572 |
| 2001/0021821 A1 * | 9/2001 | Wang et al. | 604/110 |
| 2002/0144779 A1 * | 10/2002 | Pelton | 156/327 |
| 2003/0152758 A1 * | 8/2003 | Huynh-Tran et al. | 428/295.1 |

FOREIGN PATENT DOCUMENTS

| | | |
|---|---|---|
| JP | 08-246353 | 9/1996 |
| WO | WO 99/36192 | 7/1999 |
| WO | WO 01/68784 | 9/2001 |

OTHER PUBLICATIONS

A.S. Estrin and R. W. Nalepa, "Maleinized Polybutadiene Latex for Fiber to Rubber Adhesion", 155$^{th}$ Rubber Division, American Chemical Society, Apr 13–16, 1999.

* cited by examiner

Primary Examiner—Cynthia Kelly
Assistant Examiner—J. M. Gray
(74) Attorney, Agent, or Firm—Margaret Millikin

(57) ABSTRACT

An adhesion promoter comprises a polymeric strand with an epoxy-reactive group other than a phenolic hydroxyl group, and a crosslinking group that crosslinks the polymeric strand with a rubber in a crosslinking reaction, wherein the polymeric strand is water soluble in an amount of at least 10 g/l, and more preferably at least 100 g/l. Particularly contemplated adhesion promoters may further comprise styrene-butadiene-vinylpyridine copolymer, and may advantageously be employed as a replacement for resorcinol-formaldehyde latex in the fabrication of a rubber containing tire. Especially contemplated rubber compositions may additionally comprise maleinized polybutadiene to synergistically improve adhesion of the rubber to a polymeric fiber coupled via contemplated adhesion promoters.

25 Claims, 6 Drawing Sheets x,y,z = any integer number and x+y+z < 20,000
n= integer number between 1 and 100 a, b, c = any integer number

ADHESION PROMOTERS WITH EPOXY-REACTIVE GROUPS

FIELD OF THE INVENTION

The field of the invention is adhesion promoters.

BACKGROUND OF THE INVENTION

In many composite materials, and particularly in composite materials that include rubber and polymeric fibers, adhesion between the polymeric fibers and the rubber is a significant factor in the overall performance of such composite materials, and numerous approaches are known in the art to improve adhesion between a polymeric fiber and a rubber composition.

In one approach, the surface of a polymeric fiber is physically modified with an electron beam to create particular chemically reactive groups that are then involved in forming covalent bonds between the polymeric fiber and the rubber as described in U.S. Pat. No. 4,794,041 to Gillberg-LaForce et al. Treating polyethylene terephthalate (PET) materials with an e-beam advantageously generates reactive groups (e.g., carboxylate or hydroxyl groups) on the PET surface, which may react with epoxy or isocyanate groups in the adhesive coating on the polymeric fiber to improve bonding between the PET material and a rubber. However, e-beam treatment tends to increase production cost. Moreover, Gillberg-LaForce's approach typically requires installation of relatively large and energy consuming equipment.

In another approach, the surface is chemically modified with a solvent to improve adhesion of a rubber composition of the fiber as described, for example, in U.S. Pat. No. 3,644,136 to McCullough et al or U.S. Pat. No. 3,902,950 to Tung et al. Surface treatment of a polymeric fiber is relatively simple, and may even be performed in some cases without specialized equipment. However, the use of halo-organic solvents in such treatments frequently poses environmental and/or health concerns. Moreover, surface treatment with halo-organic solvents typically still necessitates in many cases the use of resorcinol-formaldehyde-latex (RFL) to improve rubber adhesion.

To circumvent at least some of the problems associated with surface treatments, polymeric fibers may be covered with an additional layer. Such layers may be applied in the form of a spin finish, overfinish, or by dipping the polymeric fiber into one or more adhesives. There are numerous examples known in the art, and exemplary methods and compositions for spin-finish coating are described in U.S. Pat. No. 4,467,064 to Kudo et al. or U.S. Pat. No. 4,477,497 to Kudo et al. Exemplary methods and compositions for over-finish coating are described in JP 8,246,353 to Kitahara et al., and exemplary methods and compositions for dip coating are described in U.S. Pat. No. 3,429,354 to Malcom or U.S. Pat. No. 3,903,332 to Kelly et al. Although providing additional layers onto the surface of polymeric fibers frequently improves the adhesion of rubber to the fibers, the additional layers generally still need an RFL adhesive coating, which is environmentally problematic and may pose significant heath threats to workers exposed to resorcinol and formaldehyde.

In still other approaches, RFL is replaced with an acrylic resin with a molecular weight of between about 100,000 and 1,000,000 that is mixed with resorcinol-formaldehyde free latex as described by Solomon et al. in U.S. Pat. No. 4,472,463. While the use of Solomon's resins allows omission of RFL and tends to improve adhesion of latex to a substrate, the use of such resins typically requires a two-step dip process (e.g., a polyepoxide dip and an acrylic-rubber latex mixture). Moreover, Solomon's resins lack crosslinking functionalities to the latex, thereby potentially reducing optimal adhesion.

Alternatively, maleinized polybutadiene may be employed to eliminate the use of RFL as described in a paper presented at the 155th Rubber Division of the ACS, Chicago, Ill., Apr. 13–16, 1999 ("Maleinized Polybutadiene Latex for Fiber to Rubber" by A. S. Estrin and R. W. Nalepa). Although such compositions may advantageously replace RFL in some instances, maleinized polybutadiene has relatively poor water solubility and generally requires the use of sodium, potassium or ammonium hydroxides for formation of lattices and solutions in water. Moreover, adhesion of such compositions to fibers is at least in some cases less than desirable.

Although various methods and compositions for improving adhesion between a polymeric fiber and rubber are known in the art, all or almost all of them suffer from one or more disadvantages. Thus, there is still a need to provide compositions and methods for improved adhesion promoters.

SUMMARY OF THE INVENTION

The present invention is directed to an adhesion promoter comprising a polymeric strand with an epoxy-reactive group other than a phenolic hydroxyl group and a crosslinking group, wherein the crosslinking group is capable of crosslinking the polymeric strand with a rubber in a crosslinking reaction, and wherein the polymeric strand is water soluble in an amount of no less than 10 g/l, and more preferably no less than 100 g/l.

In one aspect of the inventive subject matter, the polymeric strand comprises an organic polymer, preferably polybutadiene, and more preferably a polybutadiene that is maleinized and wherein at least one carboxyl group of the maleic acid is esterified with methoxy polyethylene glycol. Especially contemplated epoxy-reactive groups include carboxylic acid groups, and especially contemplated crosslinking groups comprise a double bond which may or may not be located within the backbone of the polymeric strand. Consequently, the crosslinking reaction may involve a covalent bond with a sulfur atom, or a nucleophilic/electrophilic addition, or a cyclo-addition.

In another aspect of the inventive subject matter, contemplated adhesion promoters further comprise a second polymer, preferably a styrene-butadiene-vinylpyridine copolymer (e.g., styrene-butadiene-vinylpyridine latex). Contemplated rubbers include synthetic and natural rubbers, and it is especially preferred that the rubber may further comprise polybutadiene grafted with maleic anhydride, or that the rubber may further comprise hexamethylene tetramine, resorcinol and silica.

In a further aspect of the inventive subject matter, a rubber containing product comprises a polymeric fiber coated with a compound having a plurality of epoxy groups, wherein the polymeric fiber is coupled to a rubber via an adhesion promoter. Contemplated adhesion promoters preferably comprise a polymeric strand with an epoxy-reactive group other than a phenolic hydroxyl group, and further comprise a crosslinking group that crosslinks the polymeric strand with the rubber, and have a water solubility of no less than 10 g/l, and more preferably no less than 100 g/l. Contemplated adhesion promoters may further comprise a second polymer, preferably a styrene-butadiene-vinylpyridine copolymer (e.g., styrene-butadiene-vinylpyridine latex).

In a still further aspect of the inventive subject matter, a method of fabricating a rubber-containing product comprises a step in which rubber, and a polymeric fiber comprising a plurality of epoxy groups are provided. In a further step, an adhesion promoter is provided having a polymeric strand with an epoxy-reactive group other than a phenolic hydroxyl group, and further having a crosslinking group, and wherein the adhesion promoter is water soluble in an amount of no less than 10 g/l, and more preferably no less than 100 g/l, and in a still further step the rubber is covalently coupled with the polymeric fiber via the adhesion promoter, wherein the epoxy-reactive group forms a covalent bond with the epoxy group, and wherein the crosslinking group forms another covalent bond with the rubber. Contemplated adhesion promoters may further comprise a second polymer, preferably a styrene-butadiene-vinylpyridine copolymer (e.g., styrene-butadiene-vinylpyridine latex).

Various objects, features, aspects and advantages of the present invention will become more apparent from the following detailed description of preferred embodiments of the invention, along with the accompanying drawing.

DETAILED DESCRIPTION

The inventors have discovered that, among other desirable properties, contemplated adhesion promoters may replace RFL (resorcinol-formaldehyde-latex) as adhesion promoters in various rubber/fiber composite materials. In particular, contemplated adhesion promoters include an acid modified polybutadiene in which at least one acid group of a maleinized polybutadiene is modified with a group that increases the water solubility of the maleinized polybutadiene, and/or that increases chemical compatibility of the adhesion promoter to a polymeric fiber or other polymeric material.

Moreover, the inventors have discovered that a combination of contemplated adhesion promoters with a second polymer (preferably a styrene-butadiene-vinylpyridine latex) significantly increases the adhesion of a rubber to a polymeric fiber or yarn previously treated with contemplated adhesion promoters. Still further, the inventors have discovered that adhesion can be increased even more when the rubber comprises a maleinized polybutadiene or hexamethylenetetramine/resorcinol/silica.

Figure 1:
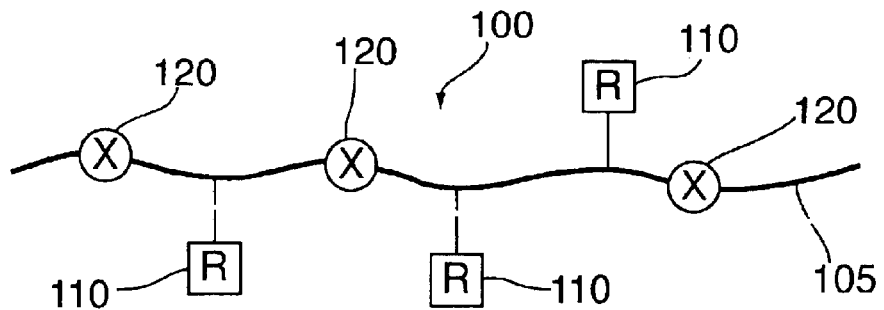
FIG. 1 is a schematic of an exemplary adhesion promoter.

FIG. 1 depicts an exemplary adhesion promoter 100 having a polymeric strand 105 that includes a plurality of crosslinking (here: unsaturated) groups 120, all of which are located in the backbone of the polymeric strand. A plurality of epoxy-reactive groups 110 are coupled to the polymeric strand 105, wherein the epoxy reactive groups are groups other than a phenolic hydroxyl group.

Figure 2:
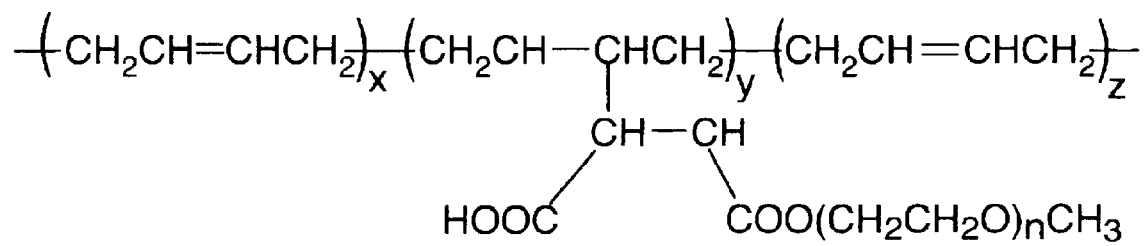
FIG. 2 is a structure of an exemplary adhesion promoter.

In a particularly preferred aspect of the inventive subject matter, the polymeric strand 105 is a polybutadiene, wherein the crosslinking groups 120 comprise double bonds and wherein at least some of the crosslinking groups are located within the backbone of the polybutadiene. It should be recognized, however, that such crosslinking groups may also be located in a pendent position (e.g., in a 1,2-vinyl microstructure in polybutadiene). The epoxy-reactive groups 110 are pendent carboxylic acid groups of maleic acid moieties, which are covalently attached to the polymeric strand, and at least some of the carboxylic acid groups are modified (here: esterified) with methoxy polyethylene glycol (having between about 1–100 repeating alkoxy groups). However, it should be recognized that the use of unmodified maleinized polybutadiene per se or maleinized polybutadiene lattices or solutions prepared by dissolving the maleinized polybutadiene in aqueous solutions containing sodium hydroxide, potassium hydroxide or ammonium hydroxide as adhesion promoter (as described in the paper presented at the 155th Rubber Division of the ACS, Chicago, Ill., Apr. 13–16, 1999; "Maleinized Polybutadiene Latex for Fiber to Rubber" by A. S. Estrin and R. W. Nalepa) is particularly excluded. As used herein, the term "backbone" refers to a contiguous chain of atoms or moieties forming a strand that are covalently bound such that removal of any of the atoms or moiety would result in interruption of the chain. As further used herein, the term "pendent group" refers to any group that is covalently coupled to a polymeric strand in a position other than the backbone. An exemplary preferred adhesion promoter is shown in FIG. 2.

Alternatively, suitable polymeric strands include all polymeric strands that have a plurality of unsaturated sites for sulfur crosslinking, or polymeric strands copolymerized of polybutadiene, polyisoprenes, styrene-butadiene copolymers (with a styrene content between about 0–35% by weight), styrene-butadiene-styrene terpolymers, or other appropriate dienes, all of which may further be maleinized. In further alternative aspects of the inventive subject matter, numerous polymeric strands other than a polybutadiene are also contemplated and such strands include organic, organometallic, and inorganic polymeric strands, and all reasonable combinations thereof. Organic polymers may be especially suitable, where it is desirable that the polymeric strand has substantially similar physicochemical properties (e.g., flexibility, solubility, or reactivity). The term "substantially similar" as used herein means a difference of no more than 25%, preferably no more than 15%, and even more preferably no more than 10%. For example, where contemplated adhesion promoters are utilized as an adhesion promoter between an epoxy coated polymeric fiber (i.e., a polymeric fiber having a plurality of epoxy groups, or coated with a compound having a plurality of epoxy groups) and a rubber composition, particularly contemplated alternative polymeric strands include copolymers and block copolymers of polybutadiene, polyisoprenes, etc. On the other hand, where rigidity is especially desirable, polyphenylenes, or other rigid-rod-type polymers may be included in or form the polymeric strand. Further contemplated organic polymers include polyesters, polyethers, polyimides, polyamides, and polycarbonates, all of which may or may not include aromatic or conjugated systems. Organo-metallic polymeric strands may be particularly advantageous where relatively high backbone strength is desirable, and especially contemplated alternative organo-metallic polymeric strands include a siloxane backbone with alkyl or aryl side chains. Contemplated inorganic polymeric chains may be advantageous where relatively high temperature resistance is particularly desired, and suitable polymeric chains include silica and alumina based polymeric chains and three-dimensional networks of such chains.

It should further be appreciated that the length of suitable polymeric strands may vary considerably, and it is generally contemplated that appropriate polymeric strands may comprise between 15–2000 monomers, and more, but preferably between 15–200 monomers. The term "monomer" as used herein refers to any repeating molecular entity that forms at least a portion of a polymeric strand, wherein the repeating molecular entity may be identical (e.g., in a homopolymer) or different (e.g., in a heteropolymer). For example, a particularly suitable molecular weight in preferred polymeric strands (e.g., polybutadiene) is between about 2000–5000. Consequently, with the molecular weight of butadiene monomer (54), preferred polymeric strands will have between about 37–92 monomers. However, the number of monomers may also be higher in alternative polymeric strands (e.g., between 100 and 2000, and more). Consequently, the molecular weight of contemplated polymeric strands may range from about 200–5000 Dalton (in some cases even less) to about 100,000 Dalton to approximately 1,000,000 Dalton, and more.

Depending on the particular type of polymeric strand, the polymeric strand may comprise one or more backbone portions, or may entirely consist of a backbone. Still further, it should be appreciated that contemplated polymeric strands and/or backbones may be crosslinked to at least some extend through either crosslinking molecules or direct covalent bonds between two polymeric strands.

With respect to the crosslinking group it is contemplated that various crosslinking groups other than a double bond located within the backbone are also suitable for use herein, and it is contemplated that alternative crosslinking groups may be located within the backbone or be pendent groups. The term "crosslinking group" as used herein refers to any element or combination of elements having sufficient reactivity to be used in covalently coupling at least two polymeric strands together. For example, where it is particularly desirable to crosslink two polymeric strands at relatively close proximity to each other, especially contemplated crosslinking groups are diene and dienophile groups disposed within the backbones. Alternatively, where a vulcanization step is included in processing a rubber composition, especially preferred crosslinking groups are double bonds, which may or may not be located within the backbone of a polymeric strand.

On the other hand, where it is desirable to couple two polymeric strands at a relatively large distance, additional crosslinkers may be employed to provide a spacer. Consequently, such additional crosslinkers will have at least two reactive groups, wherein each of the two groups will participate in a reaction coupling the crosslinker to the polymeric strands. Depending on the chemical nature of the crosslinker, contemplated crosslinking groups may vary considerably and will include nucleophilic groups, electrophilic groups, photo-reactive groups, polar groups, non-polar groups, etc. For example, where a crosslinker has a nucleophilic group (e.g., an amine), contemplated crosslinking groups may include anhydrides, activated acids, activated esters, etc. Similarly, where the crosslinker has a plurality of electrophilic groups, the crosslinking groups in the polymeric strands may include alcohols, thiols, amines, etc. Consequently, contemplated crosslinking reactions include various types of reaction and will predominantly depend on the particular chemical nature of the crosslinking group. For example preferred crosslinking reactions include formation of a covalent bond with a sulfur atom, and further include nucleophilic and electrophilic additions, eliminations, or substitutions, cycloadditions, Michael additions, etc.

It should further be appreciated that the number of contemplated crosslinking groups in a polymeric strand may differ among various applications. For example, where a high degree of crosslinking is desired, substantially all of the monomers may include a crosslinking group. On the other hand, where a high degree of crosslinking is not particularly desirable, the number of crosslinking groups may be as significantly lower and will typically between 1 crosslinking group per 2–20 monomers, in some cases 1 crosslinking group per 20–200 monomers, and in less contemplated cases 1 crosslinking group per 200 monomers, and more. Furthermore, it should be appreciated that more than one type of crosslinking group may be employed in a polymeric strand to add a particular crosslinking specificity. For example, it is particularly contemplated that hydrogen-bond donor or acceptor groups may be included into the polymeric strands as a first type of crosslinking group, while the second type of crosslinking group may form a covalent bond (e.g., in a vulcanizing reaction). Thus, it should be appreciated that crosslinking two polymeric strands may employ covalent bonds, but also non-covalent bonds, including hydrogen bonds, ionic interaction, hydrophobic interaction, etc.

In further alternative aspects of the inventive subject matter, the epoxy-reactive group need not be limited to a carboxylic acid group from a maleic acid moiety and numerous alternative epoxy-reactive groups are also contemplated. It is generally contemplated that all chemical groups that can form a covalent bond with an epoxy group are suitable in conjunction with the teachings presented herein, however, particularly contemplated epoxy-reactive groups include nucleophilic groups such as non-phenolic (primary, secondary, and tertiary) hydroxyl groups, amine groups, or sulfohydryl groups. It should further be appreciated that suitable epoxy-reactive groups may be positioned in the polymeric strand at various locations, including terminal positions, pendent positions, and within the backbone or other positions in the polymeric strand, and all reasonable combinations thereof. For example, where it is desirable to couple the polymeric strand at a relatively large distance from an epoxy group, suitable epoxy-reactive groups may be pendent groups on a terminal position of a $C_4$–$C_{20}$ arm. On the other hand, where it is desirable to couple the polymeric strand at a relatively short distance from an epoxy group, suitable epoxy-reactive groups may be pendent groups on a terminal position of a $C_1$–$C_3$ arm, or even be positioned within the backbone or terminus of the polymeric strand. With respect to the number of the epoxy-reactive groups, it should be recognized that the exact number is not limiting to the inventive subject matter, however, it is generally contemplated that suitable polymeric strands will have at least one, preferably between 2–10 epoxy-reactive groups per 1000 Dalton. In some instances, contemplated polymeric strands may have between 10–15, or even more epoxy-reactive groups per 1000 Dalton.

While it is generally contemplated that the epoxy-reactive groups are chemically identical within one polymeric strand, it is also contemplated that where desirable, more than one type of epoxy-reactive groups may be included. For example, a polymeric strand may have one type of epoxy-reactive group that directly reacts with an epoxy group, while another type of epoxy-reactive group may require an intermediary molecule (e.g., a bifunctional crosslinker) to covalently couple the second epoxy-reactive group to the epoxy group.

It is still further contemplated that the epoxy-reactive groups, and especially where such groups are carboxylic acid groups, may also be involved in functions other than forming a covalent bond with an epoxy group, and contemplated functions particularly include formation of a hydrogen bond. However, it should be recognized that additional groups for alternative functions (e.g., formation of non-covalent bonds) may be incorporated into the polymeric strand.

With respect to the epoxy group, it is contemplated that suitable epoxy groups may be located on numerous materials. For example, where contemplated polymeric strands are employed to couple rubber to a polymeric fiber (which may be fabricated into yarns or cords), the epoxy group may be an integral part (i.e., covalently coupled) of the polymeric fiber, or may be disposed in a coating compound that is coated onto the fiber or yarn as an over-finish or spin-finish. There are numerous epoxy-containing coatings for fibers and yarns known in the art, and all of them are contemplated suitable for use herein. Typical epoxy-containing compounds used in spin finish or overfinish include (3-glycidoxypropryl)trimethoxysilane, glyceryl epoxide, sorbitol epoxide, novolak epoxy resins, epoxidized oils, epoxidized polybutadiene, or epoxidized polyisoprenes, wherein epoxies include compounds comprising glycidyl ether groups, and non-glycidyl ether groups such as cyclo aliphatic epoxies or acyclic epoxies. In still further alternative aspects, the epoxy group may be replaced with a chemically reactive group other than an epoxy group (e.g., a nucleophilic or electrophilic group). Consequently, it should be appreciated that suitable epoxy-reactive groups may be groups other than previously contemplated groups and particularly include chemically reactive groups that will form a covalent bond with the chemically reactive group other than an epoxy group.

It should be particularly appreciated that contemplated adhesion promoters are water soluble in an amount of no less than 10 g/l, preferably no less than 30 g/l–200 g/l, and most preferably no less than 75 g/l–150 g/l, and that water solubility may be achieved in numerous ways. For example, where the polymeric strand is relatively hydrophobic, hydrophilic groups may be added to the molecule at various positions. As depicted in FIG. 2, a pendent methoxy polyethylene glycol (PEG) is added to the polymeric strand to afford a particular water solubility. Of course, it should be appreciated that the chain length and modification of suitable methoxy PEGs need not be restricted to a particular number of monomers (here: between 1–100) and particular type of end cap, but numerous modifications can be made by a person of ordinary skill in the art. For example, alternative water solubilizing molecules (e.g., mono-hydroxyl or mono-amine terminated polyoxyalkylenes) may be added or may replace the methoxy-PEG. The term "water soluble" as used herein means that a compound can substantially completely (i.e., at least 95 wt %) be dissolved in water at 25° C. The term "dissolved" as used herein means that the compound passes into solution without remaining in, or forming a particulate form (e.g., precipitate or powder).

Particularly preferred modifying groups (e.g., polyalkylene oxides) will include a single reactive group (e.g., a single hydroxyl group) that reacts with a maleic anhydride located on the polymeric strand to form an ester group and a carboxylic acid group from the maleic anhydride. Moreover, it is particularly preferred that the modifying group will also include at least one chemical group that contributes to increased chemical compatibility and/or affinity between the adhesion promoter and a polymeric strand. For example, it is contemplated that increasing numbers of polyethylene oxide repeating units in a modifying group will increase water dispersibility and water solubility. Additionally, polyethylene oxide is known to exhibit significant affinity towards polyesters. Alternatively, modifying groups that may be employed include polyethylene oxide, polypropylene oxide or copolymers of propylene oxide and ethylene oxide, polyamide, polyacrylamide, etc.

It should be particularly appreciated that water solubility of contemplated adhesion promoters greatly reduces, if eliminates, the need of an organic solvent other than $H_2O$, thereby advantageously reducing environmental impact, potential health hazards to operators, and cost of proper disposal of such solvents. Still further, contemplated adhesion promoters may at least partially, and more typically completely eliminate the use of RFL (resorcinol-formaldehyde-latex), a composition well known to be problematic in numerous respects. For example, formaldehyde is a toxic and cancer suspect agent. Furthermore, RFL typically requires an ageing period (reaction of resorcinol with formaldehyde) prior to use in rubber containing products, whereas there is no particular pretreatment (e.g., activation) required with contemplated adhesion promoters. In yet further alternative aspects of the inventive subject matter, it is contemplated that addition of PEG not only affords increased water solubility, but also provides a plurality of hydrogen bond donor/acceptor groups. Thus, it is contemplated that suitable adhesion promoters include a moiety that provides at least 2, more preferably at least 4, and most preferably at least 7 hydrogen donor and/or acceptor groups. Such hydrogen donor and/or acceptor groups may be located in any portion of the adhesion promoter (including the backbone and a pendent group), however, it is particularly preferred that the hydrogen donor and/or acceptor group is covalently coupled to a carboxylic acid group, which is coupled to the polymeric strand. While not whishing to be bound to a particular theory, it is contemplated that hydrogen donor and/or acceptor groups additionally or synergistically increase bonding strength between an epoxy-containing polymeric fiber and a rubber composition comprising a maleinized polybutadiene.

Moreover, it is further contemplated that addition of polyethylene glycol may increase the chemical compatibility of the adhesion promoter with the surface of the fiber. Consequently, it is contemplated that suitable adhesion promoters may include a polar group or a hydrogen bond donor- or acceptor group, where the fiber has a plurality of polar groups and/or hydrogen bond donor- or acceptor groups. Likewise, suitable adhesion promoters may include additional hydrophobic groups where the fiber has a plurality of hydrophobic and/or non-polar groups.

Figure 3:
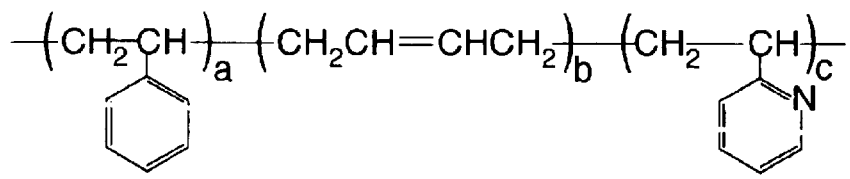
FIG. 3 is a structure of an exemplary second polymer.

In a particularly preferred aspect of the inventive subject matter, contemplated adhesion promoters are employed to couple an epoxy group-comprising fiber or yarn to a rubber or rubber composition. While it is generally contemplated that suitable adhesion promoters may be employed by themselves, it should be appreciated that a second polymer may be added to contemplated adhesion promoters. For example, an especially contemplated second polymer comprises a styrene-butadiene-vinylpyridine copolymer as depicted in FIG. 3. Addition of second polymers are contemplated to increase (additionally or synergistically) the adhesion between the rubber and the polymeric fiber or yarn (infra). While not wishing to be bound by a particular theory, it is contemplated that additional polymers crosslink with the rubber, while forming hydrogen (or other covalent or non-covalent) bonds with contemplated adhesion promoters.

Contemplated rubbers include various natural and synthetic rubbers, and all reasonable combinations thereof, and may further include maleinized polybutadiene, maleinized polyisoprenes, maleinized styrene-butadiene-copolymers, or epoxidized polyisoprene. It is especially contemplated that addition of maleinized polybutadiene to contemplated rubbers in combination with contemplated adhesion promoters further increases adhesion between the polymeric fiber or yarn and the rubber (infra).

Figure 5A:
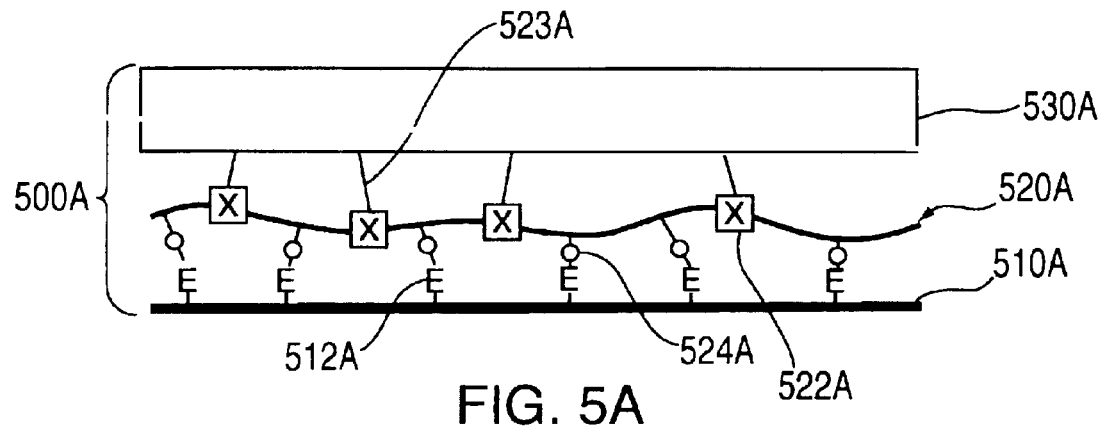
FIGS. 5A and 5B are schematics of a portion of a tire comprising the adhesion promoter.

Consequently, it is contemplated that a rubber containing product comprises a polymeric fiber coated with a compound having a plurality of epoxy groups, wherein the polymeric fiber is coupled to a rubber via an adhesion promoter, wherein the adhesion promoter comprises a polymeric strand with an epoxy-reactive group other than a phenolic hydroxyl group, and further comprises a crosslinking group that crosslinks the polymeric strand with the rubber, and wherein the adhesion promoter is water soluble in an amount of no less than 10 g/l, preferably no less than 100 g/l. An exemplary rubber containing product is depicted in FIG. 5A. The product 500A (e.g., a tire, power transmission belt, conveyor belt, etc.) comprises a polymeric fiber 510A with a plurality of epoxy groups 512A coated onto the polymeric fiber. The adhesion promoter 520A has a plurality of crosslinking groups 522A and a plurality of epoxy-reactive groups 524A other than a phenolic hydroxyl group. The epoxy-reactive groups 524A form a covalent bond with the epoxy groups 512A, and the adhesion promoter 520A is covalently coupled to a rubber 530A via a covalent bond 523A (e.g., via sulfur crosslinking).

There are numerous polymeric fibers known in the art, and all of the known polymeric fibers and yarns produced from such polymeric fibers are contemplated suitable for use in conjunction with the teachings presented herein. Particularly preferred polymeric fibers include polyester fibers (e.g., polyethylene terephthalate and polyethylene naphthalate) and polyamide fibers. With respect to structure and solubility of the adhesion promoter, the compound having a plurality of epoxy groups, and the rubber, the same considerations apply as described above.

Figure 5B:
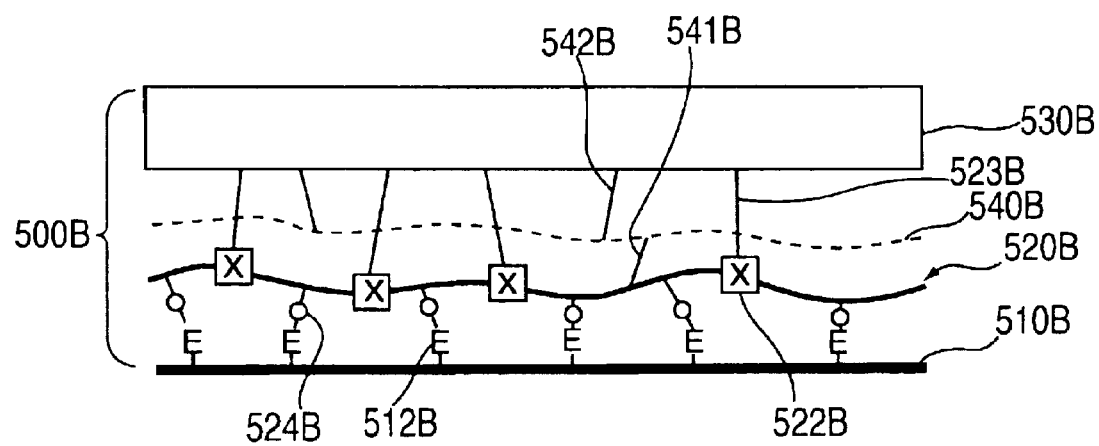

It is still further contemplated that appropriate rubber containing products may further comprise a styrene-butadiene-vinylpyridine copolymer (as part of the adhesion promoter), wherein at least a portion of the styrene-butadiene-vinylpyridine copolymer is coupled to the rubber via sulfur crosslinking, and wherein another portion of the styrene-butadiene-vinylpyridine copolymer is coupled to the acid-modified maleinized polybutadiene (via complexation of nitrogen in pyridine by acid groups in acid modified polybutadiene) as shown in FIG. 5B. The product 500B (e.g., a tire, power transmission belt, conveyor belt, etc.) comprises a polymeric fiber 510B with a plurality of epoxy groups 512B coated onto the polymeric fiber. The acid-modified maleinized polybutadiene 520B has a plurality of crosslinking groups 522B and a plurality of epoxy-reactive groups 524B other than a phenolic hydroxyl group. The epoxy-reactive groups 524B form a covalent bond with the epoxy groups 512B, and the acid-modified maleinized polybutadiene 520B is covalently coupled to a rubber 530B via a covalent bond 523B (via sulfur crosslinking). The styrene-butadiene-vinyl-pyridine terpolymer 540B is covalently coupled to the rubber 530B via covalent bonds 542B, and to the acid modified polybutadiene 520B via complexation bond 541B.

Figure 6A:
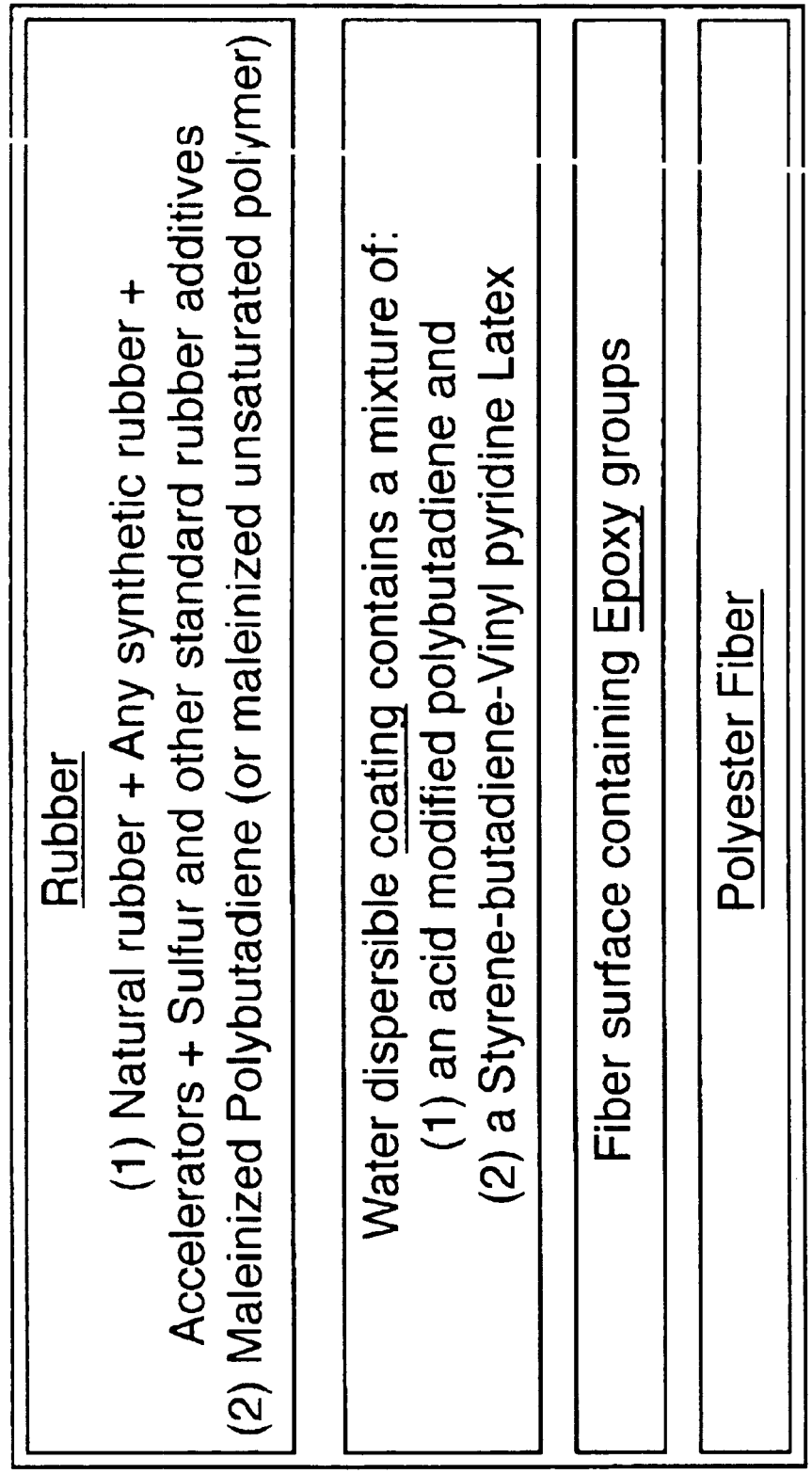
FIGS. 6A and 6B are schematics depicting an exemplary rubber containing product.
Figure 6B:
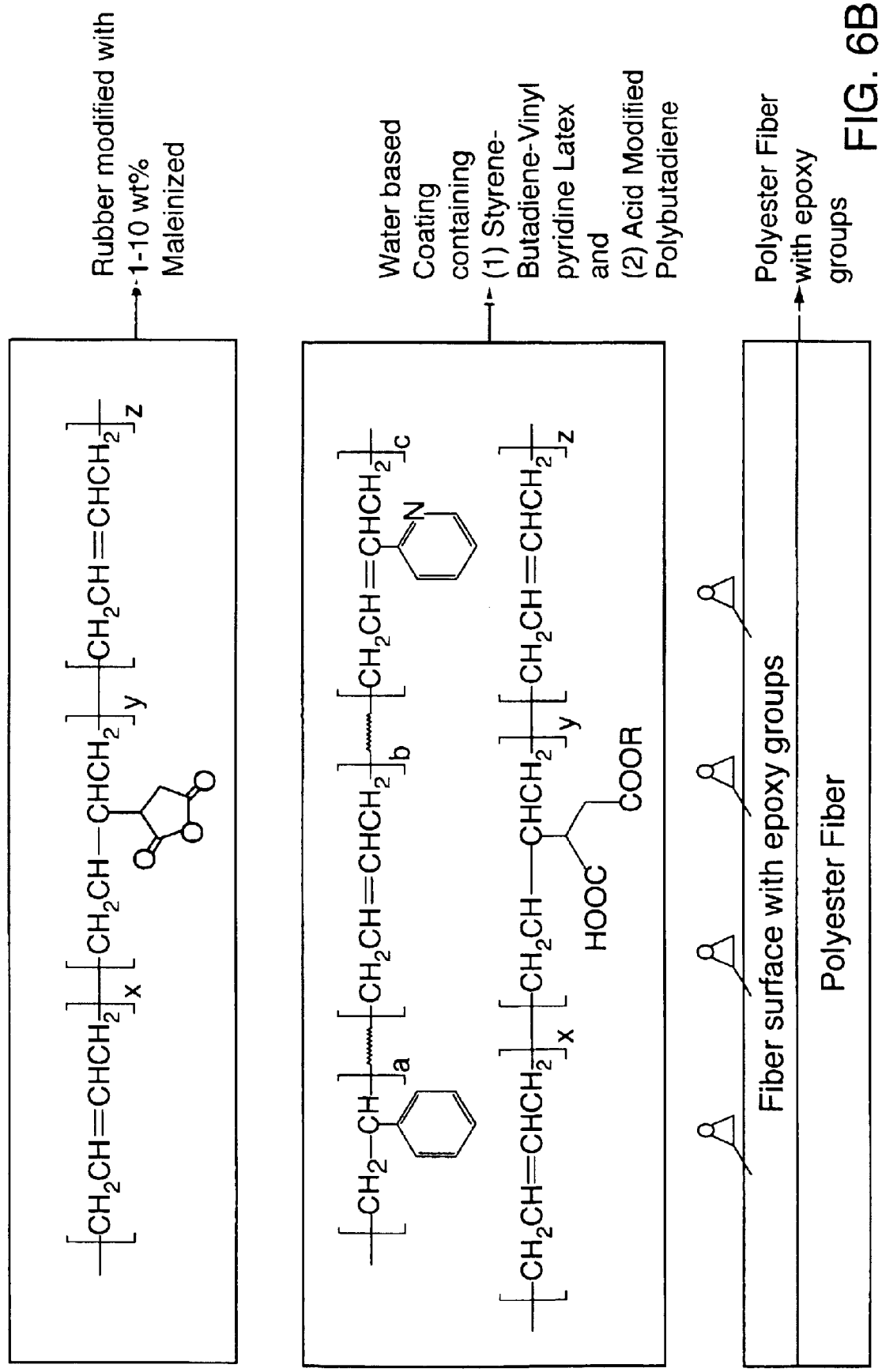
Figure 7:
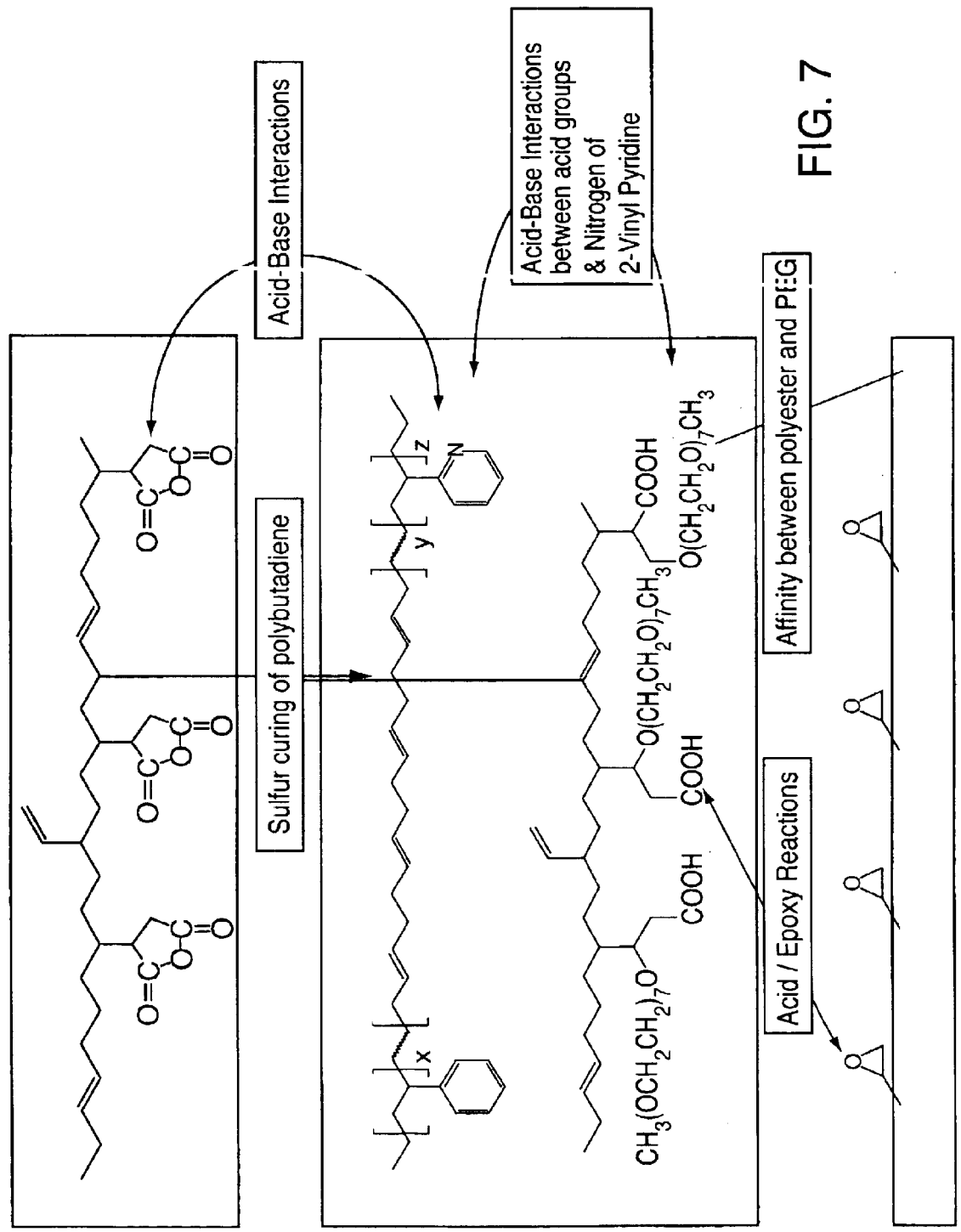
FIG. 7 is a schematic depicting various contemplated interactions of an exemplary adhesion promoter.

FIG. 6A depicts another exemplary schematic of a rubber containing product according to the inventive subject matter, in which the product generally comprises 4 components. (1) A rubber component that may comprise natural rubber, and optionally any synthetic rubbers, accelerators, activators, sulfur and other standard rubber additives. The rubber further comprises maleinized polybutadiene (or any other polyunsaturated maleinized polymer). (2) A Coating comprising an adhesion promoter (here: an acid modified polybutadiene) and a second polymer (here: a styrene-butadiene-vinyl pyridine latex). (3) A fiber (here: a polyester fiber), and (4) A plurality of epoxy groups on the fiber surface. FIG. 6B depicts the chemical composition of some of the components of the rubber containing product as shown in FIG. 6A. FIG. 7 shows some of the contemplated interactions between the maleinized polybutadiene in the rubber, the exemplary adhesion promoter and the second polymer in the adhesive coating, and the epoxy groups on the surface of a polymeric fiber.

Thus, a method of fabricating a rubber containing product comprises a step in which a rubber, and a polymeric fiber comprising a plurality of epoxy groups are provided. In a further step, an adhesion promoter is provided having a polymeric strand with an epoxy-reactive group other than a phenolic hydroxyl group, and further having a crosslinking group, and wherein the adhesion promoter is water soluble in an amount of no less than 10 g/l, preferably no less than 100 g/l. In yet another step, the rubber is covalently coupled with the polymeric fiber via the adhesion promoter, wherein the epoxy-reactive group forms a covalent bond with the epoxy group, and wherein the crosslinking group forms another covalent bond with the rubber.

In particularly preferred alternative aspects of contemplated methods, the methods may further comprise a step in which a styrene-butadiene-vinylpyridine copolymer is provided and at least a portion of the styrene-butadiene-vinylpyridine copolymer is coupled to the rubber. Additionally, it is contemplated that a maleinized polybutadiene may further be admixed with the rubber.

EXAMPLES

The following examples provide exemplary synthesis and use of contemplated adhesion promoters. Particularly contemplated examples include rubber-containing products with increased adhesion of a polymeric fiber to a rubber composition.

Preparation of an Acid Modified Polybutadiene Resin

Figure 4:
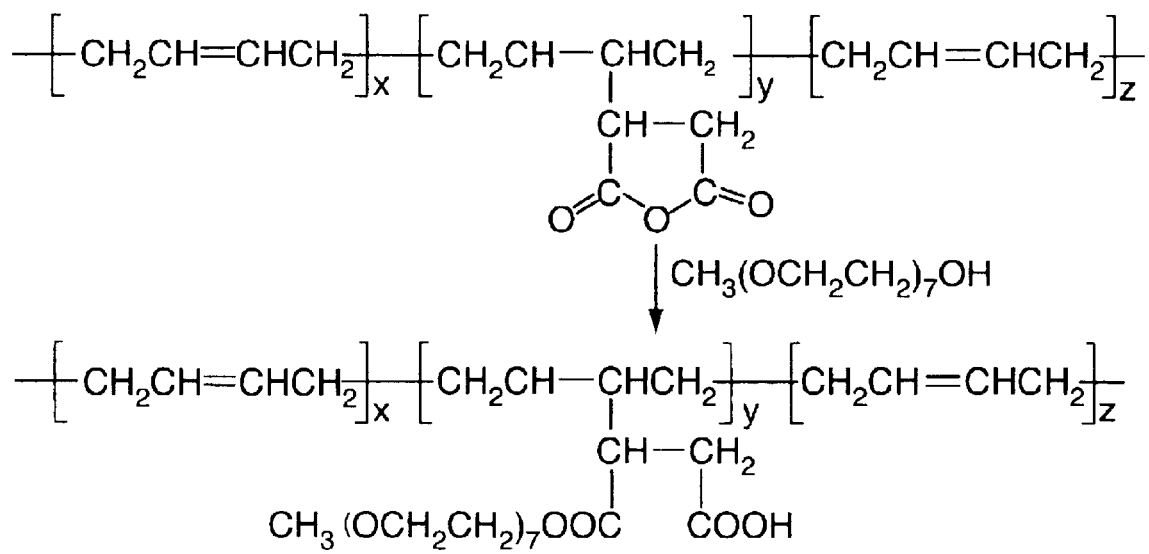
FIG. 4 is an exemplary synthetic scheme for an adhesion promoter.

An exemplary synthetic scheme of an acid modified polybutadiene is depicted in FIG. 4, and an exemplary synthetic protocol is as follows: 222 grams (0.0435 moles) of a maleinized polybutadiene (Mn=5,100; anhydride equivalent weight=577, available from Ricon Resins as Ricon 131MA17) were weighed in a 500-ml, 3-neck round bottom flask equipped with a mechanical stirrer, nitrogen purge inlet and a condenser. Subsequently, 172 grams (0.4914 moles) of polyethylene glycol monomethyl ether (Mn=350; available from Union Carbide as Carbowax Methoxypolyethylene glycol 350) were added with 0.0774 grams of pentaerythritol, tetrakis(3,5-di-tert-butyl-4-hydroxyhydrocinnamate) (available as Irganox 1010 from Ciba Specialty Chemicals). The reaction vessel was closed and nitrogen was continuously purged through the system. The reaction was heated under vigorous stirring at 160° C. for 9 hours. The progress of the reaction was monitored by IR spectroscopy. The IR spectra showed the complete disappearance of the anhydride peaks at 1863 cm$^{-1}$ and 1784 cm$^{-1}$ and the appearance of ester carbonyl peak at 1737 cm$^{-1}$. The reaction product is a brown, transparent, viscous liquid (with an acid content of 1.1 milliequivalents of acid per gram of resin) (hereinafter referred to as Polymer A).

Where maleic anhydride is employed in the synthesis of contemplated adhesion promoter, it is generally contemplated that the content of maleic anhydride in the polyunsaturated polymer may vary from 1–30 wt %, preferably between 10–35%, and more preferably between 15 and 20%. For coating applications, it is particularly contemplated that the maleic anhydride content should be selected such that the resulting acid modified polymer (i.e., after reaction with the modifying group; here: methoxy polyethylene glycol) has a sufficient amount of modifying groups to solubilize the polymeric strand in water.

Preparation of Coatings and Treated Polyester Cords

PET cords were prepared by twisting 1000 denier PET yarns into a 2-ply construction with 9.5×9.5 twists per inch. The original yarns either have a standard spin finish or an adhesive activated overfinish (greige cords).

The greige cords were subsequently treated with either (a) a conventional RFL (resorcinol-formaldehyde-latex) adhesive coating (for comparative purpose) or (b) the coatings as described herein using a single-end Litzler Computreator. Treating conditions were as follows: first, the cord was passed through a dip tank containing the coating. Dip pick up was controlled between 5–6 weight percent. The emerging dipped cord then passed through a first hot air oven at 350° F. for 60 seconds followed by a second hot air oven at 475° F. for 60 seconds. The composition of the coatings that were used for treating the PET cords are as follows:

| | |
|---|---|
| Control RFL | Resorcinol-Formaldehyde-Latex |
| Coating 1 | Prepared by dispersing 80 grams of Polymer A (as prepared in Example above) with 800 grams of deionized water |
| Coating 2 | Vinylpyridine-Butadiene-Styrene latex (15 percent vinyl pyridine/70 percent butadiene/15 percent styrene) available as GenTac 118 from Omnova Solutions Inc. diluted to 20 weight percent solids with deionized water |
| Coating 3 | Mixture containing equal parts by weight of Coating 1 and Coating 2 |
| Coating 4 | Prepared by dissolving 0.8 grams of 2-ethyl-4-methyl-imidazole and 80 grams of Polymer A (prepared as described in Example 1) in 800 grams of deionized water |
| Coating 5 | Mixture of equal parts of Coating 2 and Coating 4 |
| Coating 6 | Ricon FX 9966 (maleinized polybutadiene latex available from Ricon Resins) |

Preparation of Rubber Coupons for Adhesion Testing

ASTM method D2229-98 was adopted for the adhesion testing of the polyester tire cords to rubber. The standard rubber formulation used to prepare the test coupons for the Peel Adhesion Test is as follows (expressed as parts by weight): 37 parts of natural rubber, 8.4 parts of styrene-butadiene rubber, 14.4 parts of polybutadiene rubber, 28 parts carbon black, 3.8 parts activators/accelerators, 1.3 parts sulfur and 7.1 parts of plasticizers, tackifiers and antioxidants. For the modified rubbers, the appropriate maleinized polybutadiene resin was compounded with the standard rubber at 3, 5 and 10 weight percent depending on the desirable test rubber.

The treated cord was then wound on a winding drum (6.5 inches in diameter, that was wrapped with a strip of test rubber) to form a pad of 6 inches in width with an average of about 36–40 ends per inch. The cord/rubber pad was removed from the drum, laid flat on a work bench with the exposed cord side facing up. A strip of backing rubber was then placed on the top of the cord surface to form the complete test pad. Two 6 inches by 8 inches sections were cut from the test pad and strips of separator cloth (1 inch in width) were placed at each end of the sections. One section was placed on the top of the other with the test rubber layers facing each other. The combined test pad was subsequently cured at 350° F. for 6 minutes under 333 psi pressure. The cured test pad was conditioned for a minimum of 16 hours at 75° F. prior to testing. Test strip samples (1 inch by 4 inches) were cut from the cured pad.

Peel Adhesion Test

The hot peel test was carried out using an Instron Tensile tester at a pull rate of 4 inches per minute. The test strips were conditioned in an oven at 250° F. for 30 minutes and pulled apart immediately after removing from the oven. The maximum force required to pull the test coupon apart is reported as the peel strength in lbs/in (pounds per inch). Visual rating (grade) was determined according to the percentage of rubber still observable on the cord surface after the two parts of the strip have been pulled apart. A "0 rating" corresponds to no rubber coverage or adhesive failure at the rubber/cord interface and a "5 rating" means that there is 100% rubber coverage indicating a cohesive failure of the rubber and good adhesion between the cord and the rubber.

Adhesion using Acid Modified Polybutadiene and Synergistic Effect of Acid Modified Polybutadiene and Vinyl Pyridine-Butadiene-Styrene Latex Table 1 shows the Peel Adhesion Test data of PET cords with two different adhesive activated overfinishes, and treated with different coatings (preparation see above) according to the inventive subject matter. For comparative purpose, the PET cord was also treated with a standard RFL (resorcinol-formaldehyde-latex) adhesive composition that is being widely used in the tire industry to treat the tire cords.

TABLE 1

| | Peel Strength (lbs/in)[1] | Visual Rating |
|---|---|---|
| Overfinish 1 | | |
| Greige cord | 8.5 | 0 |
| Coating 1 | 8.3 | 1 |
| Coating 2 | 8.2 | 0.7 |
| Coating 3 | 21.2 | 4.3 |
| Overfinish 2 | | |
| Greige cord | 8.3 | 0 |
| Coating 1 | 7.2 | 0 |
| Coating 2 | 6.1 | 0 |
| Coating 3 | 23.3 | 4.1 |
| Control RFL | 37.2 | 4.9 |

[1]Adhesion data tested with standard rubber

As can be seen from Table 1, cords treated with either an acid modified polybutadiene (Coating 1) or a vinyl pyridine-butadiene-styrene latex (Coating 2)(VP/B/ST latex) exhibited adhesion to at least some degree. Remarkably, when the acid modified polybutadiene is combined with the VP/B/S latex (Coating 3), significant improvement in peel adhesion strength is observed. The inventors contemplate, that the synergistic effect on adhesion is likely due to interaction between the acid groups of the acid modified polybutadiene and the vinyl pyridine of the VP/B/ST latex.

Comparison of Adhesion Performance of Acid Modified Polybutadiene Latex and Maleinized Polybutadiene Latex[4]

Coating 1=Acid modified Polybutadiene of this invention. Coating 2=Vinyl pyridine-Butadiene-Styrene Latex. Coating 6=Maleinized Polybutadiene Latex.

TABLE 2

|  | Standard rubber | | PBMA Rubber[1] | | HRH Rubber[2] | |
| --- | --- | --- | --- | --- | --- | --- |
|  | Peel Strength (lbs/in) | Visual Rating | Peel Strength (lbs/in) | Visual Rating | Peel Strength (lbs/in) | Visual Rating |
| (1) Greige cord | 2.9 | 1 |  |  | 35.3 | 4.8 |
| (2) Coating 6 | 10.7 | 1.8 | 10.4 | 0 | 12 | 1.2 |
| (3) Coating 6 and Coating 2[3] | 15 | 2 | 3.5 | 0 | 17.7 | 1.7 |
| (4) Coating 1 | 6.4 | 0.8 | 18.5 | 1.2 | 23.1 | 2.2 |
| (5) Coating 1 and Coating 2[3] | 22.8 | 3.3 | 48 | 4.4 | 41.5 | 4.4 |
| (6) Control RFL | 38 | 5 |  |  |  |  |

[1]Standard rubber modified with 10 wt % of maleinized polybutadiene (PBMA; Mn = 5100; 17 weight percent maleic anhydride; available as Ricon 1731 from Ricon Resins Inc.)
[2]Standard rubber modified with HRH (hexamethylene tetramine/resorcinol/silica) adhesion promoter system
[3]Double dip system: first coating was applied before first oven, second coating was applied after passing through first oven, before going through second oven
[4]"Maleinized Polybutadiene Latex for Fiber to Rubber Adhesion", by A. S. Estrin and R. W. Nalepa, Paper presented at the 155th Rubber Division, American Chemiscal Society, Chicago, Illinois April 13–16, 1999

The data in Table 2 clearly illustrate the surprising increase in effectiveness of contemplated adhesion promoters (here: acid modified polybutadiene as prepared in example above) in promoting adhesion as compared to maleinized polybutadiene latex as previously described. Furthermore, it can be seen that contemplated adhesion enhancers are significantly more effective than the maleinized polybutadiene latex in improving adhesion of polyester cords to various rubbers with a pronounced improvement when modified rubbers were used.

Effect of Modified Rubber on Adhesion

To investigate if the rubber composition may have a further influence on the adhesion, modified rubber compositions including maleinized polybutadiene were prepared. Surprisingly, as indicated in Table 3, addition of maleinized polybutadiene into the rubber further increased the adhesion of the rubber to the polymeric fibers when adhesion promoters according to the inventive subject matter were employed.

TABLE 3

| PET Cords having different overfinishes and coated with Coating 5 | Standard rubber | | Modified Rubber 3% PBMA[1] | | Modified Rubber 5% PBMA[1] | |
| --- | --- | --- | --- | --- | --- | --- |
|  | Peel Strength (lbs/in) | Visual Rating | Peel Strength (lbs/in) | Visual Rating | Peel Strength (lbs/in) | Visual Rating |
| Overfinish 1 | 16.5 | 4 | 22.1 | 3.8 | 20.6 | 3.3 |
| Overfinish 2 | 15.3 | 3 | 22.7 | 4.2 | 25.1 | 4.2 |
| Overfinish 3 | 21.2 | 4.3 | 23.4 | 4.2 | 34.8 | 4.2 |
| Overfinish 4 | 21.8 | 2.8 | — | — | 29.6 | 4.1 |
| Control RFL | 34.3 | 4.8 | — | — | — | — |

[1]Standard rubber modified with maleinized polybutadiene (PBMA; Mn = 5100; 17 weight percent maleic anhydride; available as Ricon 1731 from Ricon Resins Inc.)

It can be seen from Table 3 that the combined use of (a) a coating from a blend of an acid modified polybutadiene with vinyl pyridine-butadiene-styrene latex and (b) a rubber modified with maleinized polybutadiene showed peel strength adhesion equivalent to the control RFL system.

Consequently, it should be especially recognized that adhesion of polymeric fibers to rubber may be significantly improved by including adhesion promoters according to the inventive subject matter, and especially an acid modified polybutadiene in combination with a second polymer (especially vinyl pyridine-butadiene-styrene latex). While not wishing to be bound by a particular theory, the inventors contemplate that there is a synergistic effect between the acid modified polybutadiene and the vinyl pyridine-butadiene-styrene latex, which may be attributed to the acid-base interactions between the two polymer systems.

Furthermore, it should be appreciated that polyethylene oxide acid modified polybutadiene as described herein are surprisingly and significantly more effective than the ammonium hydroxide/sodium hydroxide or potassium hydroxide maleinized polybutadiene latex as described previously. Still further, the combined use of an acid modified polybutadiene/vinyl pyridine-butadiene-styrene latex coating with a maleinized polybutadiene rubber showed improved adhesion of polyester cords equivalent to the current RFL system. Therefore, adhesion promoters according to the inventive subject matter may provide a formaldehyde-free coating, which may be an environmentally sensible replacement for the current RFL systems.

Thus, specific embodiments and applications of adhesion promoters with epoxy-reactive groups have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An adhesion promoter comprising:
    a polymeric strand with an epoxy-reactive group other than phenolic hydroxyl group and further comprising a crosslinking group;
    wherein the crosslinking group is capable of crosslinking the polymeric strand with a rubber in a crosslinking reaction; and
    wherein the polymeric strand is water soluble in an amount of no less than 10 g/l and wherein said polymeric strand comprises polybutadiene which is grafted with a maleic anhydride and wherein the maleic anhydride is reacted with a compound selected from the group consisting of a methoxy polyethylene glycol, a monoamine terminated polyoxyalkylene, and a monoalcohol terminated polyoxyalkylene.

2. The adhesion promoter of claim 1 further comprising a second polymer.

3. The adhesion promoter of claim 2 wherein the second polymer comprises a styrene-butadiene-vinylpyridine terpolymer.

4. The adhesion promoter of claim 3 wherein the rubber further comprises polybutadiene grafted with maleic anhydride.

5. The adhesion promoter of claim 1 wherein the epoxy-reactive group is a carboxylic acid group.

6. The adhesion promoter of claim 1 wherein the crosslinking group is in the backbone of the polymeric strand.

7. The adhesion promoter of claim 6 wherein the crosslinking group comprises a double bond.

8. The adhesion promoter of claim 1 wherein the crosslinking reaction comprises formation of a covalent bond with a sulfur atom.

9. The adhesion promoter of claim 1 wherein the crosslinking reaction comprises a reaction selected from the group consisting of a nucleophilic addition, an electrophilic addition, and a cycle addition.

10. The adhesion promoter of claim 1 wherein the rubber is at least one of a synthetic rubber and a natural rubber.

11. The adhesion promoter of claim 1 wherein said polymeric strand is soluble in water in an amount of no less than 30 g/l to 200 g/l.

12. The adhesion promoter of claim 1 wherein the crosslinking group is in a dependent position to the polymeric strand.

13. The adhesion promoter of claim 12 wherein the crosslinking group comprises a 1,2 vinyl microstructure in polybutadiene.

14. The adhesion promoter of claim 1 wherein the epoxy-reactive group is selected from the group consisting of non-phenolic hydroxyl groups, amine groups and sulfohydryl groups.

15. The adhesion promoter of claim 1 wherein the maleic anhydride is reacted with a polyalkylene oxide.

16. The adhesion promoter of claim 1 wherein the maleic anhydride is reacted with a methoxy polyethylene glycol.

17. The adhesion promoter of claim 1 which consists essentially of said polymeric strand.

18. An adhesion promoter comprising:
   a polybutadiene polymeric strand grafted with a maleic anhydride, the maleic anhydride being reacted with a methoxy polyethylene glycol, and further comprising a crosslinking group;
   wherein the crosslinking group is capable of crosslinking the polymeric strand with a rubber in a crosslinking reaction; and
   wherein the polymeric strand is water soluble in an amount of no less than 10 g/l.

19. The adhesion promoter of claim 18 further comprising a styrene-butadiene-vinylpyridine terpolymer.

20. The adhesion promoter of claim 19 wherein the rubber further comprises a polybutadiene grated with maleic anhydride.

21. The adhesion promoter of claim 19 wherein said polymeric strand is soluble in water in an amount of no less than 30 g/l to 200 g/l.

22. The adhesion promoter of claim 19 wherein the polybutadiene has a molecular weight of from about 2000 to 5000.

23. The adhesion promoter of claim 22 wherein the maleic anhydride is present man amount of from 1 to 30 weight percent.

24. The adhesion promoter of claim 23 wherein the maleic anhydride is present in an amount of from 15 to 20 weight percent.

25. An adhesion promoter consisting essentially of:
   a polybutadiene polymeric strand grafted with a maleic anhydride, the maleic anhydride being reacted with a methoxy polyethylene glycol, and further comprising a crosslinking group;
   wherein the crosslinking group is capable of crosslinking the polymeric strand with a rubber in a crosslinking reaction;
   wherein the polymeric strand is water soluble in an amount of no less than 10 g/l; and
   a styrene-butadiene-vinylpyridine terpolymer.

* * * * *